Figure 1:
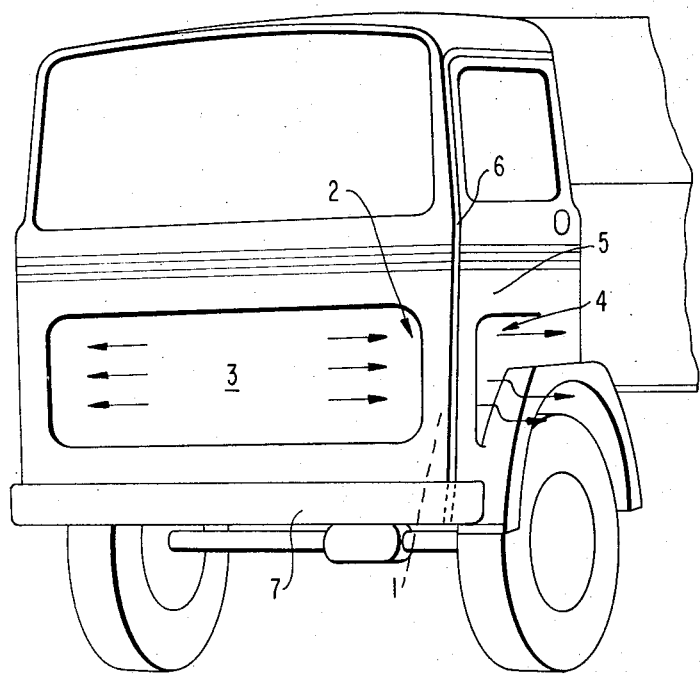

United States Patent
Götz

[11] 3,836,191
[45] Sept. 17, 1974

[54] DRIVER CAB OF TRUCKS
[75] Inventor: Hans Götz, Sindelfingen, Germany
[73] Assignee: Daimler-benz Aktiengesellschaft, Stuttgart, Germany
[22] Filed: July 6, 1972
[21] Appl. No.: 269,434

[30] Foreign Application Priority Data
July 7, 1971 Germany.......................... 2133737

[52] U.S. Cl................. 296/1 S, 296/28 C
[51] Int. Cl............................................. B62d 33/06
[58] Field of Search................. 296/1 S, 28 C, 91; 105/2 R, 2 A

[56] References Cited
UNITED STATES PATENTS

| | | | |
|---|---|---|---|
| 2,255,494 | 9/1941 | Rhoads | 105/2 R |
| 2,863,695 | 12/1958 | Stamm | 296/1 S |
| 3,583,757 | 6/1971 | Wilfert et al. | 296/91 X |
| 3,653,709 | 4/1972 | Gravett | 296/1 S |
| 3,666,316 | 5/1972 | Wilfert | 296/91 X |
| 3,696,732 | 10/1972 | Rodgers | 296/91 X |

FOREIGN PATENTS OR APPLICATIONS

| | | | |
|---|---|---|---|
| 1,462,747 | 11/1966 | France | 296/91 |
| 500,186 | 11/1954 | Italy | 296/1 S |
| 1,235,164 | 2/1967 | Germany | 296/91 |

OTHER PUBLICATIONS
German Utility Model 6940346; published 1/15/70 (Klasse 63c, 43-80).

Primary Examiner—Robert J. Spar
Assistant Examiner—Leslie J. Paperner
Attorney, Agent, or Firm—Craig & Antonelli

[57] ABSTRACT

A driver cab of trucks which has preferably a substantially cubic base shape and is equipped with air guide channels that extend from the front end wall of the vehicle on the inside of its body to the side walls and discharge thereat; rain ledges are provided which extend at least within the area of the approximately vertically extending front edges of the driver cab up to approximately the lower edges thereof.

11 Claims, 2 Drawing Figures

DRIVER CAB OF TRUCKS

The present invention relates to a driver cab of trucks, which preferably has an essentially cubic base form and which is equipped with air guide channels which extend from the front end wall of the vehicle on the inside of the body to the side walls and discharge thereat.

Such types of constructions have been proposed heretofore in order to eliminate or at least strongly reduce by means of direct air flows a strong soiling and dirtying of the lateral walls of vehicles with body shapes unfavorable from a streamlining point of view, which would otherwise occur during certain weather conditions.

The present invention is thereby concerned with the task to so further develop an installation of the aforementioned type that dirt is far-reachingly kept off the side walls of a vehicle equipped in such a manner.

Accordingly, a driver cab of trucks, which preferably has an essentially cubic base shape and is equipped with air guide channels that extend from the front end wall of the vehicle on the inside of the body to the lateral side walls and discharge thereat is proposed, whereby according to the present invention, rain ledges or mouldings are provided at least within the area of the essentially vertically extending front edges of the driver cab which ledges or mouldings extend to the lower edge of the driver cab.

According to a particularly advantageous embodiment of the present invention, the rain ledges or mouldings within their lower area extend behind the bumper.

It is achieved by such an arrangement that dirty water impinging upon the front end wall of the vehicle, which additionally is displaced toward the side by the windshield wipers, cannot reach the area of the side walls but that instead this water is caught and is conducted off toward the road surface.

As particularly effective has proved an arrangement in which the front edges of the rain ledges or mouldings are disposed approximately in the plane of the windshield pane or of the front wall of the vehicle.

Furthermore, it may be advantageous if a rain ledge or moulding is also arranged at each of the approximately vertically extending rear edges of the driver cab.

Accordingly, it is an object of the present invention to provide a driver cab of commercial types of vehicles which eliminates the shortcomings existing in the prior art constructions.

Another object of the present invention resides in a driver cab for trucks which further improves the reduction of soiling of the side walls of the vehicle.

A further object of the present invention resides in a driver cab provided with means effectively preventing or at least far-reachingly reducing the soiling of the side walls of the driver cab, which are simple in construction and extraordinarily effective for the intended purposes.

Figure 2:
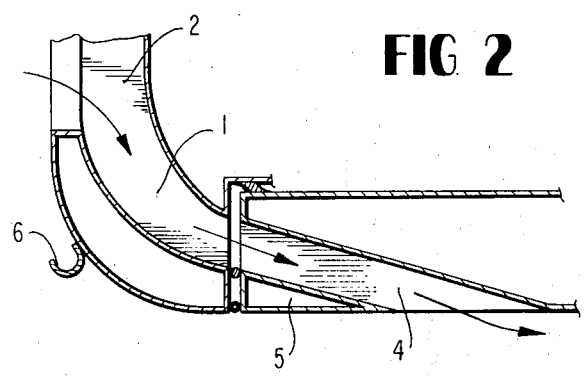

These and other objects, features, and advantages of the present invention will become more apparent from the following description when taken in connection with the accompanying drawing which shows, for purposes of illustration only, one embodiment in accordance with the present invention, and wherein:

FIG. 1 is a perspective view of a driver cab of a truck, shown only partially, as viewed from in front and the left of the truck, and FIG. 2 is a somewhat schematic horizontal cross sectional view through one corner area of a driver cab in accordance with the present invention.

Referring now to the drawing, the driver cab illustrated therein of an otherwise conventional truck includes on each side an air-guide channel or duct 1 within the body, whose air inlet generally designated by reference numeral 2 is arranged at the front end wall 3 of the driver cab and whose air discharge generally designated by reference numeral 4 is arranged at a respective side wall 5. Starting from the roof of the driver cab, a rain ledge or moulding 6 extends to the lower edge of the driver cab along each forward side edge thereof whereby the lowest portion of each rain ledge or moulding 6 extends to the rear of the bumper 7.

If so desired, a similar rain ledge or moulding may also be provided at each of the approximately vertically extending rear edges of the driver cab.

While I have shown and described only one embodiment in accordance with the present invention, it is understood that the same is not limited thereto but is susceptible of numerous changes and modifications as known to those skilled in the art. For example, the rain ledge or moulding 6 may be of any appropriate design as known in the art and may be fastened to the body by conventional means. Hence, I do not wish to be limited to the details shown and described herein but intend to cover all such changes and modifications as are encompassed by the scope of the appended claims.

What I claim is:

1. A driver cab of trucks which includes a front end wall and side walls, a bumper and which is equipped with air-guide channel means extending from the front end wall of the driver cab on the inside of its body to the lateral walls thereof and discharge thereat, characterized in that rain ledge means are provided which extend at least within the area of the essentially vertically extending front edges of the driver cab to approximately the lower edge of the driver cab, said driver cab having an essentially cubic base shape, and said rain ledge means extend in the lower area thereof to the rear of the bumper.

2. A driver cab according to claim 1, characterized in that the front edges of the rain ledge means are disposed approximately in the plane of the windshield.

3. A driver cab according to claim 1, characterized in that the front edges of the rain ledge means are disposed approximately in the plane of the front end wall.

4. A driver cab according to claim 1, characterized in that one rain ledge means each is also arranged at approximately vertically extending rear edges of the driver cab.

5. A driver cab according to claim 4, characterized in that the front edges of the rain ledge means are disposed approximately in the plane of the windshield.

6. A driver cab according to claim 4, characterized in that the front edges of the rain ledge means are disposed approximately in the plane of the front end wall.

7. A vehicle having a front end wall, side walls, and a bumper, and including means for reducing the soiling of the side walls of the vehicle, said means comprising: air intake means provided on said front end wall, air discharge means provided on respective side walls, air channel means extending into the body of the vehicle for communicating said air intake means with said air discharge means, and vertically extending means provided on respective sides of the front end wall between said air intake means and said air discharge means for directing soiled water away from the side walls of the vehicle, said vertically extending means including rain ledges extending substantially along the entire height of the front end wall, the lower end of said rain ledges is disposed to the rear of said bumper.

8. A vehicle according to claim 7, wherein the vehicle is provided with a windshield and said rain ledges are disposed approximately in the plane of said windshield.

9. A vehicle according to claim 8, wherein said rain ledges are disposed approximately in the plane of the front end wall.

10. A vehicle according to claim 9, wherein additional vertically extending means are provided at the rear of each of the side walls.

11. A vehicle according to claim 10, wherein said additional vertically extending means include rain ledges disposed at the rear edges of said side walls.

* * * * *